Sept. 12, 1950 K. REINHARD 2,521,747
BROACH
Filed Oct. 16, 1945 2 Sheets-Sheet 1
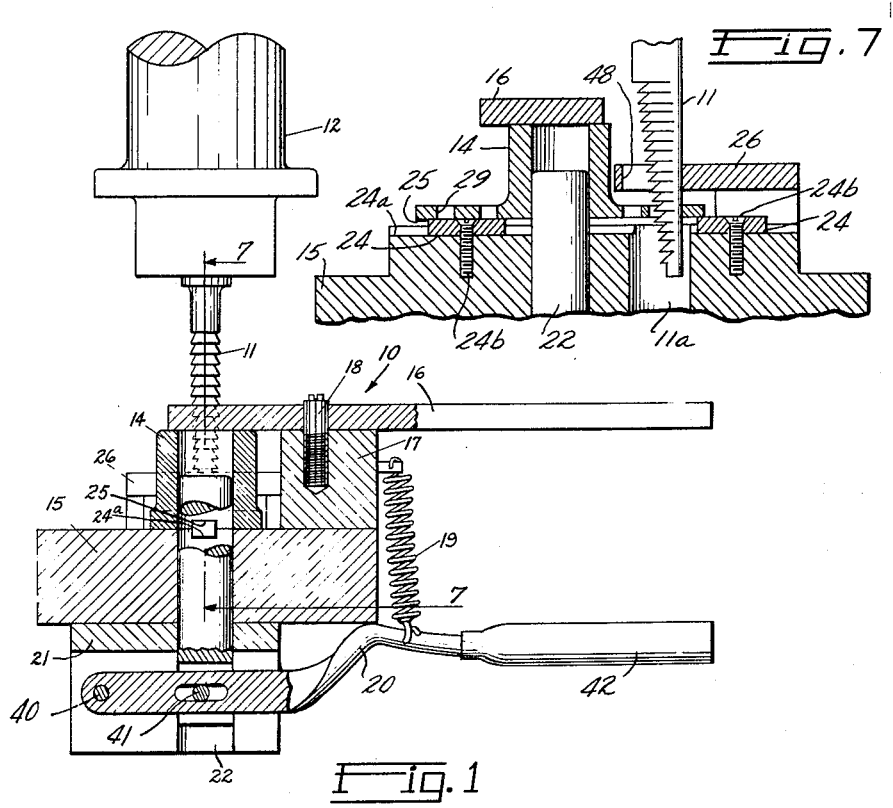
Fig. 7
Fig. 1
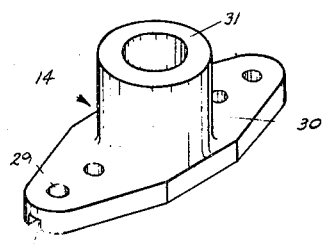
Fig. 4
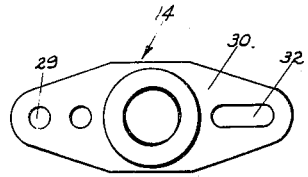
Fig. 5
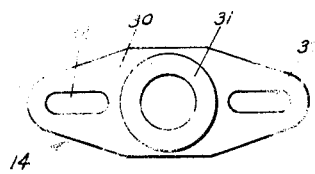
Fig. 6
INVENTOR.
Karl Reinhard
BY
*Ralph L Chappell*
ATTORNEY.

Sept. 12, 1950 K. REINHARD 2,521,747
BROACH
Filed Oct. 16, 1945 2 Sheets-Sheet 2
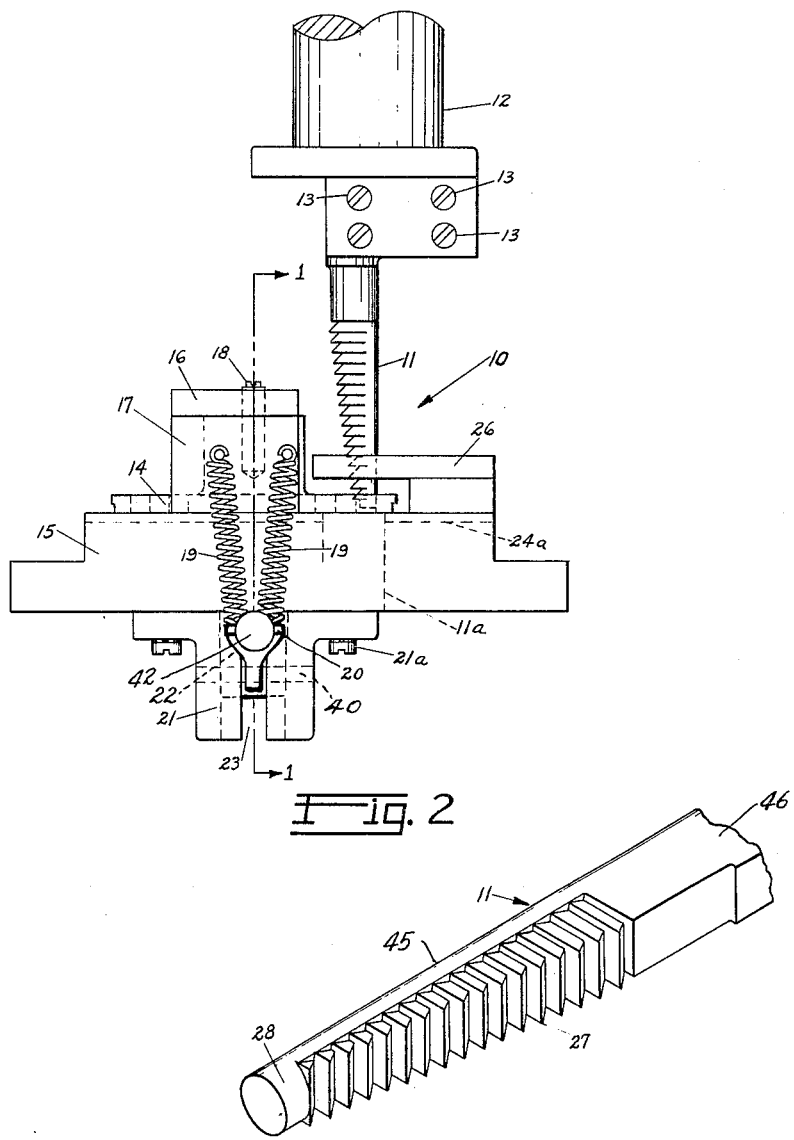
INVENTOR.
Karl Reinhard
BY
Ralph L Chappell
ATTORNEY.

UNITED STATES PATENT OFFICE 2,521,747

BROACH

Karl Reinhard, New York, N. Y.

Application October 16, 1945, Serial No. 622,663

4 Claims. (Cl. 90—33)

(Granted under the act of March 3, 1883, as amended April 30, 1928; 370 O. G. 757)

This invention relates in general to a method for providing elongated holes and in particular to a broach and a broaching operation.

In the construction of certain articles such as, for example, gun parts and the like, it is frequently necessary to provide elongated holes in brittle castings. Many gun parts are manufactured of cast brass and similar brittle materials which are not capable of withstanding a punching operation, and some of these castings are provided with elongated holes. In these instances it has been customary to resort to machining operations which are costly and inefficient.

It is an object of this invention to provide a method and apparatus for making elongated holes in brittle materials.

It is another object of this invention to provide a broach for making elongated holes in brittle materials.

It is an additional object of this invention to provide a method of broaching elongated holes in brittle cast materials.

Further objects and advantages of this invention, as well as its construction, arrangement and operation, will be apparent from the following description and claims in connection with the accompanying drawings, in which;

Fig. 1 is a cross-sectional elevation of the device of the invention, taken on line 1—1 of Fig. 2, Fig. 2 is a front elevation of the apparatus shown in Fig. 1, Fig. 3 is a perspective of the broaching tool embodied in the invention, Fig. 4 is a perspective of a work piece suitable for practice of the invention, manufacture of the shown work piece having been completed to the stage at which it is ready for the broaching operation of the invention, Fig. 5 is a top plan view of the work piece of Fig. 4 after one broaching operation, Fig. 6 is a top plan view of the finished work piece, and Fig. 7 is a cross sectional elevation taken on line 7—7 of Fig. 1.

In Figs. 1 to 3 the teeth on the broaching tool have been exaggerated to illustrate them more clearly.

There is shown in Figs. 1 and 2 a fixture, generally designated 10, that operates to hold a work piece 14 for machining by the tool 11.

Tool 11 is a broaching tool, and is adapted to be operated in a punch press which may be of conventional construction. Accordingly, the fixture 10 is positioned in the punch press, for example by being fastened to the surface of the conventional punch press platen. The fixture is preferably raised from the surface of the platen, for example by being rested on spacer blocks not shown, thus to provide clearance under the fixture for chips to fall onto and through the punch press platen not shown, and also to provide clearance for the tool 11 in its cutting stroke.

The tool 11 is attached to the tool holder 12 of the machine by any suitable means, such as the screws 13, Fig. 2, the shank end 46 of the tool 11 being formed to any suitable contour that adapts it to the tool holder 12 of the particular punch press in which the fixture 10 of the invention is to be used.

The fixture 10 comprises the work-holding plate 15, in the form of a surface plate, on which the work piece 14 is positioned. The lever 16, mounted pivotally at 18 on the spacer member 17, Fig. 2, is manually operable to clamp the work piece 14 in position on the plate 15.

The locating pin 22 is mounted to slide in the bore through the surface plate 15, and to project into the bore in the boss 31 of the work piece 14; the locating pin 22 thus operating to center the work piece 14 in the jig 10. The surface plate 15 is slotted at 24a to receive the key 24, that is fastened in the slot 24a in any suitable manner, for example by means of the screw 24b. See Fig. 7. The key 24 engages the keyway 25 in the work piece 14, and serves to hold the piece 14 located in the jig 10 in proper position for the tool 11 to perform the machining operation.

The bracket 21 is attached to the bottom surface of the plate 15, by means of the screws 21a, for example. The bracket 21 is slotted at 23 to contain the lever 20, pivoted at 40 to move up and down in the slot 23. The lever 20 is projected through the locating pin 22, and is attached thereto by means of the pivot pin 41. Tension springs 19 operate to raise the lever 20 and hold it in its raised position shown in Figs. 1 and 2. This projects the locating pin 22 into the bore of the work piece 14. The lever 20 is provided with the handle 42 for manually depressing it to remove the pin 22 out of the bore of the work piece 14.

A suitable work piece 14 for practice of the invention is illustrated in Figs. 4, 5 and 6. It comprises, for example, the boss 31 that is bored, the pin 22 of the jig being adapted to fit the bore of the boss 31. The piece comprises the wings 30, and these are provided with elongated holes 32, Fig. 6, for example for attachment of the piece when it is assembled into a component or unit.

The purpose of the present invention is to machine the elongated holes 32.

Preparatory to the broaching operation, the holes 29 are drilled in the wings 30, diameter of the holes 29 preferably conforming with the width of the slots 32, and the holes 29 being located in the wings 30 to form the rounded ends of the slots 32.

The width of the broaching tool 11 conforms with the width of the slots 32, and one edge 45 of the tool is rounded semi-circular, the radius of the half-round 45 preferably conforming with the radius of the holes 29. The cutting teeth 27 of the tool 11 extend away from the half-round edge 45 thereof along the sides and opposite edge of the tool as shown. The end of the tool 11 is provided with the pilot pin 28, the diameter of which preferably conforms with the diameter of the holes 19 in the piece. The circle of the pin 28 coincides with the arc of the half-round edge 45, as shown in Fig. 3.

The cutting teeth 27 of the tool are stepped as shown in Fig. 3, to progressively widen the tool away from the pilot pin 28 towards the shank end of the tool. Under preferred practice a shank 46 is provided that has a rectangular edge opposite the half-round edge 45, the width of the tool in the shank corresponding with the distance between centers of adjacent holes 29 plus the radius of the half-round 45. As previously noted, the teeth 27 are shown exaggerated, in actual practice the teeth 27 being stepped in increments of approximately 0.010" in accordance with prior art practice of broaching tool design.

The jig 10 is provided with the tool guiding plate 26, which is attached to the work holding plate 15 in the manner illustrated in Fig. 2. The slot 48 in the plate 26 serves to guide the tool 11 to the work, and serves to back the tool during the broaching operation. The end of the slot 48 is preferably rounded to conform with the half-round edge 45 of the tool and provide a bearing to support the thrust of the cutting operation exerted widthwise of the tool.

Pursuant to practice of the invention, a job set-up is made to position the jig in the punch press in the manner illustrated in the drawings. A work piece 14, in the condition illustrated in Fig. 4, is then placed in the jig, the handle 42 being depressed and released for the pin 22 to enter the bore in the boss 31 of the piece from below. The piece is also oriented in the jig to seat the keyway 25 over the key 24, and the lever 16 is swung to the position shown in the drawings to hold the piece 14 against the surface of the plate 15. The piece is now ready for the first machining operation of the invention.

The tool 11 is in line with the outermost hole 29 of one of the wings 30, and when the punch press is operated to descend the tool 11, the pilot pin 28 of the tool first enters the hole 29 in line with the tool. The cutting teeth 27 operate to remove the material between the holes 29 of the given wing 30, forming the slot 32, and this continues until the shank 46 of the tool enters the machined hole. It will be noted that the tool is backed by the half cylinder of the hole 29 that receives the pilot pin 28, and also by the end of the slot 48, to support it against the thrust exerted widthwise of the tool by the cutting operation.

The piece 14 is now in the condition illustrated in Fig. 5. When the tool 11 rises to its uppermost position, the lever 16 is operated to release the piece, which is then rotated 180° on the center of the pin 22, and the lever 16 is again operated to clamp the piece in the jig. The punch press is again operated to depress the tool 11, and it now removes the material between the pair of holes 29 of the other wing 30. The piece 14 is then completed and in the condition illustrated in Fig. 6, with both elongated holes 32 machined.

It will be clear to persons skilled in the art that the device of the invention enables a difficult machining operation to be performed quickly and at low cost.

It is obvious that a pair of broaches may be substituted for the single broach 11 shown in the figures. However, this has not been done at the present time because the use of a single broach insures that no workman need place his finger below the operating portions of the machine and accordingly, the single broach, although it takes longer to complete a piece 14, is to a certain extent a safety device. It will be understood, however, that the use of a double broach with an appropriate safety device is within the scope of this invention.

Numerous other variations and modifications in the above described device will be obvious to those skilled in the art and it is to be understood that the scope of this invention is to be determined not by the specific illustrations given hereinbefore, but on the contrary, the scope of the invention is to be determined by the apparent claims.

The invention described herein may be manufactured and used by or for the Government of the United States of America for governmental purposes without the payment of any royalties thereon or therefor.

What is claimed is:

1. A broaching tool for elongated holes comprising a semi-cylindrical side wall, cutting edges extending peripherally of the tool embodying the remainder of the side walls beyond the semi-cylinder, the thickness of the tool equaling the diameter of the semi-cylinder, and the width of the tool varying progressively lengthwise thereof to a width greater than the diameter of the semi-cylinder.

2. In a tool as defined in claim 1, a cylindrical locating plug projecting from the narrower end of the tool, the plug having the same diameter as the semi-cylinder and being coextensive therewith.

3. Apparatus for producing an elongated hole in a casting comprising a punch-press including a tool holder, a broaching tool carried by the tool holder.

4. Apparatus for producing an elongated hole in a casting comprising a punch-press including a tool holder, a broaching tool carried by the tool holder and comprising a semi-cylindrical side wall, cutting edges extending peripherally of the tool embodying the remainder of the side walls beyond the semi-cylinder, the thickness of the tool equaling the diameter of the semi-cylinder, and the width of the tool varying progressively lengthwise thereof to a width greater than the diameter of the semi-cylinder, a work holder operable to locate the casting in the punch-press in position for the hole to be formed.

KARL REINHARD.

(References on following page)

REFERENCES CITED

The following references are of record in the file of this patent:

UNITED STATES PATENTS

| Number | Name | Date |
|---|---|---|
| 150,909 | Stewart | May 12, 1874 |
| 280,866 | Ryan | July 10, 1883 |
| 2,050,901 | Sundell | Aug. 11, 1936 |
| 2,165,977 | Maxwell | July 11, 1939 |
| 2,184,383 | Glenny | Dec. 26, 1939 |
| 2,392,747 | LaPointe | Jan. 8, 1946 |

FOREIGN PATENTS

| Number | Country | Date |
|---|---|---|
| 205,415 | Great Britain | Oct. 18, 1923 |